July 31, 1928.  E. L. DELANY  1,678,769
FLOAT VALVE
Filed April 11, 1927
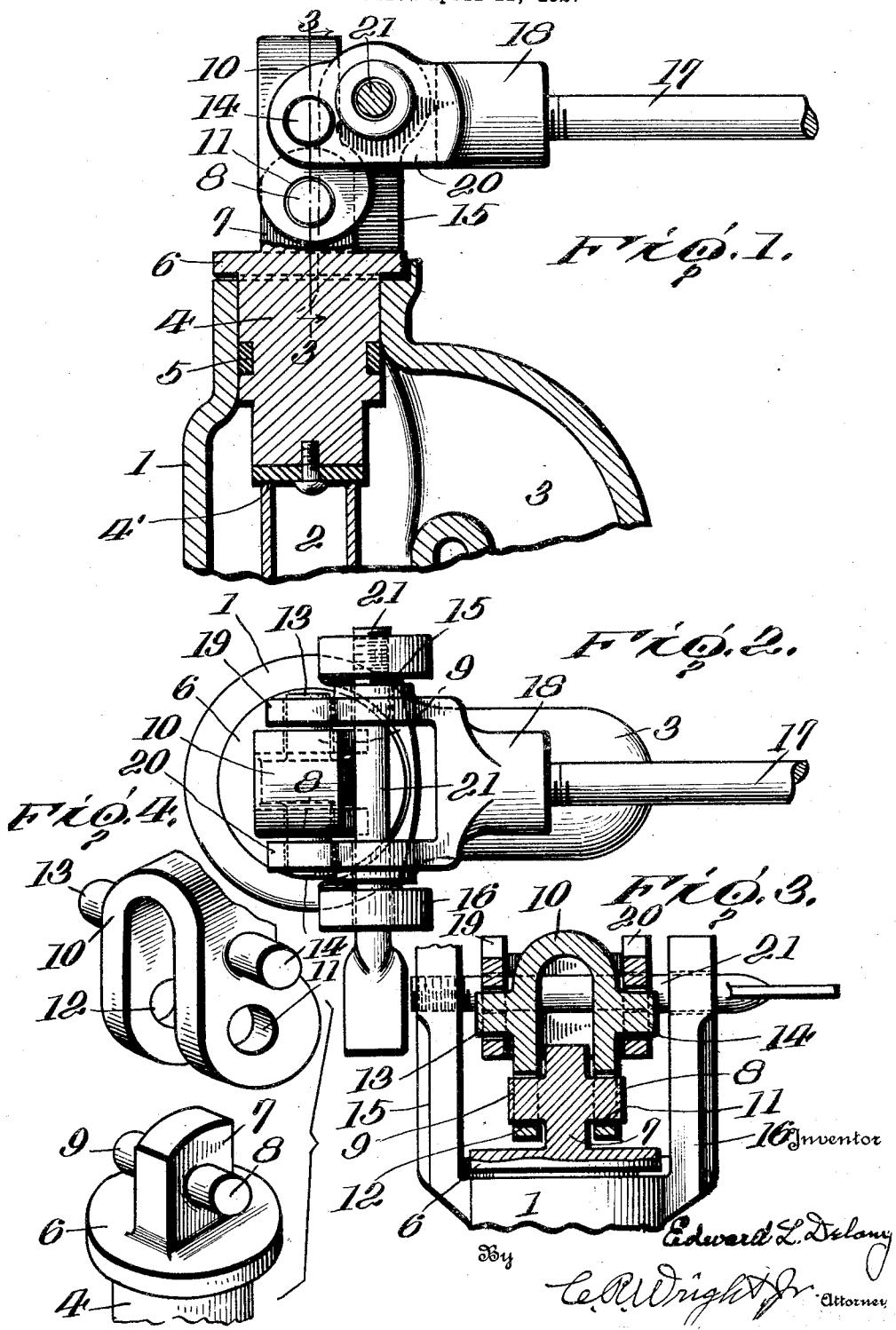

Patented July 31, 1928.

1,678,769

UNITED STATES PATENT OFFICE.

EDWARD L. DELANY, OF BROOKLYN, NEW YORK.

FLOAT VALVE.

Application filed April 11, 1927. Serial No. 182,918.

My invention relates to improvements in float valves.

The object of my invention is to provide a float valve for flush tanks in which the pivotal connection of the float lever with the valve casing is close to the pivotal connection of the lever with the valve, and thus increase the leverage so as to insure the proper feeding of the valve by less movement of the float lever and is particularly adapted for flush tanks in which high pressure water systems are used.

Another object of my invention is to provide a valve, a float lever, and a compensating link of cast metal, the valve and compensating link provided with integral trunnions adapted to cooperate with each other, and with the float lever and at the same time providing a limited sidewise movement to prevent jamming of the lever caused by any side movement of the float and thus insure the proper seating of the valve.

A further object of my invention is to provide a valve of this character in which the parts can be readily assembled and removed from the valve casing, and at the same time provide a simple, cheap and effective valve of this character having certain details of structure and combination of parts hereinafter more fully set forth.

In the accompanying drawings:

Figure 1 is a vertical sectional view of the valve casing showing my improved valve and operating means.

Figure 2 is a top plan view of Figure 1.

Figure 3 is a vertical transverse sectional view taken on the line 3—3 of Figure 1.

Figure 4 is a perspective view of the upper end of the cast valve and compensating link in their separated relation.

Valves and operating mechanisms of the character herein shown are submerged in water, and the different characters of water cause a very rapid corrosion of the metal, and it is known that cast metal having a good proportion of copper will not corrode, and therefore one of the main features of this invention is the casting of the valve with integral trunnions adapted to cooperate with the compensating link, and which link is cast, and having trunnions integrally cast therewith to cooperate with the float lever.

Referring now to the drawings, 1 represents the valve casing, which as shown, is provided with the water inlet 2, and the outlet 3. Arranged within the upper end of the casing is the cast valve 4 co-operating with the valve seat 4' and having any desired packing 5 to form a tight connection with the wall of the casing to prevent leakage. The upper end of the valve 4 has cast integral therewith a flange 6 which prevents the splashing of any leakage, and extending upwardly therefrom is the reduced rectangular cast projection 7 having the trunnions 8 and 9 cast integral therewith. It will be understood that these trunnions being cast metal it is necessary to polish them to give a smooth bearing surface.

The compensating link 10 is of cast metal and of an inverted U shaped form, and the lower ends of the arms thereof are provided with the openings 11 and 12 which are adapted to receive the trunnions 8 and 9. The arms of the compensating link can be opened up so that it can be placed in position with the trunnions 8 and 9 in the openings 11 and 12 and pressed together to assume the position shown in Figure 3 of the drawings. The outside faces of the arms of the link 10 are provided with cast trunnions 13 and 14, which like the trunnions 8 and 9 must be polished to form a smooth bearing surface. The valve casing 1 is provided with two upwardly extending rigid arms 15 and 16, the upper ends of which are very close to the trunnions 13 and 14 carried by the compensating link. The arm 17 of the float lever is screwed into the bifurcated casting 18, the arms 19 and 20 of which are provided at their outer ends with openings which receive the trunnions 13 and 14. In the application of this casting the arms 19 and 20 are spread apart to receive the trunnions 13 and 14 and are forced together in the position shown in Figure 3 of the drawings. The arms of the casting 18 are provided with oppositely arranged openings through which the pin 21 passes, and said pin also passes through openings in the arms 15 and 16. This pin is preferably threaded into the arm 15 to prevent the accidental displacement.

From the foregoing description it will be seen that the pin 21 is very close to the trunnions 13 and 14 for increasing the leverage and all of the pivots except 21 are cast, and therefore will not corrode. The pin 21 is preferably made of an alloy of copper, aluminium and iron which is not readily affected by water of different characters and therefore will not corrode rapidly, and by the structure shown and described I have provided a valve in which there is practically no necessity of replacement of any of the pivotal connections between the float lever, compensating link and the valve.

Having thus fully described my invention what I claim is:—

1. A float valve comprising a casing, a valve therein, a float lever pivotally connected to the casing, a link pivotally connected to the float lever and to the valve the pivotal connection of said link comprising trunnions cast integral with the valve and link.

2. A float valve comprising a casing, a cast valve therein, a cast float lever pivotally connected to the casing, and a compensating pivoted connecting member between the cast valve and the cast float lever having pivots which are cast integral therewith.

3. A float valve comprising a casing, a cast valve therein, a cast float lever pivotally connected to the casing, a cast compensating link pivotally connected to the float lever and to the valve, the pivotal connection of said link comprising trunnions carried by the valve and link and cast integral therewith.

4. A float valve comprising a casing, a cast valve therein having an upwardly extending reduced portion provided with cast trunnions, a cast compensating link adapted to receive said trunnions, and having trunnions cast therewith, a cast float lever pivotally connected to the casing, and adapted to receive the trunnions carried by the compensating link.

5. A float valve comprising a casing, a cast valve therein having trunnions cast integral therewith on opposite sides, a cast compensating link having openings to receive the trunnions carried by the valve, trunnions cast integral with the opposite faces of the compensating link, a cast float lever pivoted to the casing and adapted to receive the cast trunnions carried by the compensating link.

6. A float valve comprising a casing, a valve therein having integral cast trunnions at its upper end on opposite sides, a cast U shaped compensating link having openings to receive the cast trunnions carried by the valve, cast integral trunnions carried by the opposite faces of the compensating link, a bifurcated float lever mounted upon the trunnions carried by the compensating link and having a removable pin connection with the valve casing.

7. A float valve comprising a casing, a cast valve therein having integral trunnions, a cast compensating link piotally mounted on the trunnions and having integral trunnions, a cast float lever pivotally mounted upon the compensating link trunnions and having a removable pivotal pin connection with the casing.

8. A float valve comprising a casing, a cast float lever pivotally connected to the casing by a removable pin, a valve, a link connecting the float lever with the valve, and having integral cast trunnions forming its connection with the lever.

9. A float valve comprising a casing, a valve therein, a float lever pivotally connected to the casing, a link, and integrally cast trunnions on the link and valve connecting the link with the valve and the float lever.

10. A float valve comprising a casing, a valve therein having cast integral trunnions, a pivoted float lever, and a link pivoted on said trunnions and having a cast integral trunnion connection with the float lever.

11. A float valve comprising a casing, a valve therein, a compensating link pivoted to said valve and having cast integral trunnions, and a cast float lever adapted to be sprung over said trunnions.

12. A float valve comprising a casing, a valve therein, having cast integral trunnions, a cast float lever pivotally connected to the casing, and a compensating link pivoted on said trunnions and having an integral cast trunnion connection with the said lever.

In testimony whereof, I have signed this specification.

EDWARD L. DELANY.